US008467988B1

(12) United States Patent
Röder et al.

(10) Patent No.: US 8,467,988 B1
(45) Date of Patent: Jun. 18, 2013

(54) METHOD AND SYSTEM FOR VALIDATION OF MASS SPECTROMETER MACHINE PERFORMANCE

(71) Applicants: Joanna Röder, Steamboat Springs, CO (US); Heinrich Röder, Steamboat Springs, CO (US); Maxim Tsypin, Steamboat Springs, CO (US)

(72) Inventors: Joanna Röder, Steamboat Springs, CO (US); Heinrich Röder, Steamboat Springs, CO (US); Maxim Tsypin, Steamboat Springs, CO (US)

(73) Assignee: Biodesix, Inc., Boulder, CO (US)

( * ) Notice: Subject to any disclaimer, the term of this patent is extended or adjusted under 35 U.S.C. 154(b) by 0 days.

(21) Appl. No.: 13/733,018

(22) Filed: Jan. 2, 2013

(51) Int. Cl.
*G01C 25/00* (2006.01)

(52) U.S. Cl.
USPC .......... 702/116

(58) Field of Classification Search
USPC .. 702/116, 23; 356/326; 250/339.11; 706/25; 435/23
See application file for complete search history.

(56) References Cited

U.S. PATENT DOCUMENTS 6,864,978 B1 * 3/2005 Hazen et al. .................. 356/326
7,109,491 B2 9/2006 Shinden
7,736,905 B2 6/2010 Roder et al.
8,044,354 B2 * 10/2011 Werner et al. ............ 250/339.11
2007/0185824 A1 * 8/2007 Hitt ................................ 706/25
2010/0317044 A1 * 12/2010 Findeisen et al. ............... 435/23
2012/0191370 A1 * 7/2012 Roder et al. .................... 702/23

OTHER PUBLICATIONS

Cairns et al., "Integrated multi-level quality control for proteomic profiling studies using mass spectrometry", BMC Bioinformatics 2008; 9:519.

* cited by examiner

*Primary Examiner* — Tung S Lau
*Assistant Examiner* — Xiuquin Sun
(74) *Attorney, Agent, or Firm* — McDonnell Boehnen Hulbert & Berghoff LLP

(57) ABSTRACT

A method and system for validating machine performance of a mass spectrometer makes use of a machine qualification set of samples. The mass spectrometer operates on the machine qualification set of samples and obtains a set of performance evaluation mass spectra. The performance evaluation spectra are classified with respect to a classification reference set of spectra with the aid of a programmed computer executing a classification algorithm. The classification algorithm also operates on a set of spectra obtained in a previous standard machine run of the machine qualification set of samples. The results from the classification algorithm are then compared with respect to predefined, objective performance criteria (e.g., class label concordance and others) and a machine validation result, e.g., PASS or FAIL, is generated from the comparison.

20 Claims, 5 Drawing Sheets

METHOD AND SYSTEM FOR VALIDATION OF MASS SPECTROMETER MACHINE PERFORMANCE

CROSS-REFERENCE TO RELATED APPLICATIONS

Not applicable.

STATEMENT OF FEDERALLY SPONSORED RESEARCH

Not applicable.

BACKGROUND

Mass spectrometry is a method for analyzing the mass-to-charge ratio distribution of constituents of a sample. The method uses an instrument known as a mass spectrometer, of which several different types exist. Matrix Assisted Laser Desorption and Ionization-Time of Flight (MALDI-ToF) mass spectrometers are commonly used in the life sciences. In MALDI-ToF, a sample/matrix mixture is placed on a defined location (spot) on a metal plate, known as a MALDI plate. A UV laser beam is directed onto a location in the spot for a very brief instant (known as a "shot"), causing desorption and ionization of molecules or other constituents of the sample. The sample components "fly" to a mass spectrometer detector due to the presence of an electric field. The instrument measures mass to charge ratio (m/z) and intensity of the components in the sample and generates the results in the form of a spectrum.

Typically, in a MALDI-ToF measurement, there are several hundred shots applied to each spot on the MALDI plate and the resulting spectra (each shot produces one spectrum) are summed to produce an overall mass spectrum. U.S. Pat. No. 7,109,491 discloses representative MALDI plates used in MALDI-TOF mass spectrometry. The plates include a multitude of individual locations or spots where the sample is applied to the plate, typically arranged in an array of perhaps several hundred such spots. Mass spectrometers for performing MALDI-ToF are available from a number of different manufacturers, and persons skilled in the art are familiar with their basic design and function. In this document, we use the terms "machine", "mass spectrometer" and "instrument" interchangeably.

Mass spectrometry has many uses in the life and physical sciences. One of the uses is to classify a sample into one or more groups based on the similarity of features in a mass spectrum obtained from the sample to a reference spectrum, or collection of reference spectra, with the aid of a computer-implemented classifier. One example of this use is a test of the applicant's assignee, known as VERISTRAT®. This test is a MALDI-ToF mass spectrometry serum-based test that has clinical utility in the patient selection for specific targeted therapies for treatment of solid epithelial tumors. See U.S. Pat. No. 7,736,905, the content of which is incorporated by reference herein, which describes the test in detail. In brief, a mass spectrum of a serum sample of a patient is obtained. After certain pre-processing steps are performed on the spectrum, the spectrum is compared with a training (or reference) set of class-labeled spectra of other cancer patients with the aid of a computer programmed as a classifier. The class-labeled spectra are associated with two classes of patients: those that benefitted from treatment with epidermal growth factor receptor inhibitors (EGFRIs), class label of "Good", and those that did not, class label of "Poor". The classifier assigns a class label to the spectrum under test. The class label for the sample under test is either "Good" or "Poor," or in rare cases where the classification test fails the class label for the sample is deemed "indeterminate."

A given mass spectrometer used in classification of samples, such as for example in the VERISTRAT test, may be subject to periodic adjustments, replacement of parts or other maintenance or service as incident to the normal use and wear and tear on the machine. Additionally, the machine itself may be subject to performance drift over time. These adjustments, replacements of parts, maintenance or service, as well as performance drift, can cause the instrument itself to produce a spectrum from a given sample which may exhibit slight, but still significant, changes relative to another spectrum produced from the very same sample prior to the service, maintenance or replacement of parts, or at some earlier point in time. These changes may affect the accuracy of the test, and could, in theory, cause the test to produce an incorrect class label for the sample.

Hence, there is therefore a need for validating or "qualifying" the performance of a mass spectrometer so as to ensure that the spectra produced from samples after service, maintenance or replacement of parts, or over the course of time, are consistently and reliably classified. This invention meets that need.

Previous machine qualification protocols for mass spectrometers have been based on a subjective assessment of spectra produced by standardized preparations of known proteins in known concentrations. The article of Cairns et al., *Integrated multi-level quality control for proteomic profiling studies using mass spectrometry*, BMC Bioinformatics 2008 9:519, describes a quality control process to allow for the identification of low quality spectra reliably. The present applicants have also used feature concordance plots to qualify mass spectrometer performance. Feature concordance plots are plots of the intensity of individual selected features (peaks, e.g., peaks used for classification) in two sets of spectra (e.g., obtained from two aliquots of the same sample before and after maintenance or service). Human evaluation of the plots is used to determine if the machine performance meets a standard of "qualification" or "validation." This prior art method is inadequate, because it requires prior experience and expertise in analyzing the spectra and peaks used in the concordance plot, and the process involves a subjective assessment of the quality of concordance.

In this disclosure, a method is provided for a fully-specified, objective, and automated approach to evaluation of mass spectrometry machine performance.

SUMMARY

A method and system for validation of the performance of a mass spectrometer are disclosed. Unlike the prior art, the present method and system assesses machine performance based on the performance of a classifier operating on mass spectra obtained by the machine from a predefined set of samples ("machine qualification sample set") and a reference set of spectra. The reference set of spectra in preferred embodiments takes the form of the set of spectra generated at a prior date on a mass spectrometer with verified adequate performance, which are used in conjunction with a classification algorithm to classify test samples during normal use of the mass spectrometer. This set of spectra is referred to as the "classification reference set" in the following discussion.

In essence, once the machine has been initially qualified, a "standard machine run" of the machine qualification sample set is performed on the mass spectrometer and the spectra from each of the samples in the set are saved in computer memory. At a later time when the machine is to be re-validated or qualified, for instance after some maintenance or repair operation on the machine has been performed, the same machine qualification sample set is run through the machine and spectra from each of the samples in the set are obtained ("test machine run"). Both sets of spectra are then run through the classifier. Criteria for machine performance are applied by comparison of the results of the classification algorithm on the two sets of spectra (e.g., class label concordance, class label concordance after removal of indeterminate test results, counts of nearest neighbors of a given class label for each of the spectra obtained from the machine qualification sample set, and statistics associated with such counts, such as average and variance). In one example described below, there are five such objective criteria that are specified. If all five criteria are met, the machine is deemed validated, whereas if any one of the five criteria is not met the machine is deemed to not be in a validated state, and further investigation or adjustments to the machine are performed and the process repeated.

The methodology is particularly useful for performance qualification of mass spectrometers used in classification of spectra using K-nearest neighbor ("K-NN") classification algorithms wherein a set of features (peaks, or intensity values at predefined m/z ranges) in a test spectrum are compared to those of class-labeled spectra forming a reference set for the classification; for each test spectrum, the K nearest neighbors in feature space in the reference set for the classification are determined, and the class label for the test spectrum is decided based on a majority vote of the class labels of this set of K neighbors. In this context, a minimum level of concordance of the class label produced for the spectra is necessary, and is one of the possible criteria used for validation of machine performance described below. However, there is a need for higher sensitivity such that the method should be able to detect deterioration of performance of a mass spectrometer before it impacts test results. Furthermore, choosing suitable fixed standards for individual feature value concordance for each feature used in a classification algorithm (e.g. K-NN) would be possible, but in some situations is not justifiable given the multivariate nature of some mass-spectrometry tests such as those described in the above-cited patent document. Looking at the nearest neighbors used in the algorithm for classification gives more sensitivity than measuring the classification label concordance, is an inherently multivariate approach linked to the functioning of the test, and allows for relatively easy assessment of performance based on pre-specified criteria. Thus, in another aspect, the criteria for validation of the machine performance may also include assessment of the counts of class membership of nearest neighbors in the classification reference set determined during classification of the spectra from the standard machine and test machine runs.

In one aspect of this disclosure, a method for validating machine performance of a mass spectrometer is disclosed. The method includes a step a) of providing a set of samples which serve as a machine qualification sample set. Methods of identifying a suitable set of samples to be used as the machine qualification sample set are disclosed. The method continues with a step b) of operating the mass spectrometer on the machine qualification sample set and thereby obtaining a set of performance evaluation spectra. This step will be referred to in the following description as a "test machine run." The method further includes a step c) of executing a classification algorithm on the performance evaluation spectra with respect to a classification reference set of spectra with the aid of a programmed computer. The classification reference set of spectra is preferably a set of spectra which are used in the classification of test samples during normal use of the mass spectrometer.

The method further includes a step d) of executing the classification algorithm on a set of spectra obtained from the machine qualification sample set in a previous standard machine run of the machine qualification sample set with respect to the classification reference set with the programmed computer.

The method further includes a step e) of comparing the results from the execution of the classification algorithm in step c) (the test machine run) with the results of the execution of the classification algorithm in step d) (the standard machine run). The method further includes a step f) of generating a machine validation result from the comparison of step e). For example, if the comparison includes evaluation of 5 different criteria as to the results of classification (class label concordance, etc.) and all 5 criteria are satisfied the machine performance is deemed to be in a validated state.

In one aspect, the comparing step includes a comparison of classification label concordance between the results of the execution of the classification algorithm in step c) with the results of the execution of the classification algorithm in step d). In another aspect, the comparing step may assess class label concordance after exclusion of those spectra that resulted in an indeterminate sample class label, for example in the situation where spectra from three aliquots of the same sample in the machine qualification reference sample set did not all produce the same class label.

In another example, as shown in FIGS. 1A and 1B below, the comparing step may include a comparing of the count of the number of nearest neighbors having a given class label (e.g., "poor" class label) in the K nearest neighbors of the classification reference set of spectra for each sample in the machine qualification sample set in the execution of the classification algorithm of steps c) and d), determining whether the maximum difference in the counts between the machine test run and the standard machine run over the entire machine qualification sample set exceeds a threshold, whether the average difference in the counts exceeds a threshold, and whether the variance in the difference in the number of counts exceeds a threshold.

In one application of this invention, the mass spectrometer is used in the ordinary course to generate spectra from human blood-based samples and supply the spectra to a computer configured as a classifier. In this example, the machine qualification sample set takes the form of a set of N samples comprising blood-based samples from human patients and the classification reference set takes the form of a set of mass spectra used for classification of other blood-based samples with a class label in accordance with the classification algorithm.

As noted, one of the aspects of this invention is the use of a machine qualification sample set. The selection of samples to make up this set is preferably such that the mass spectra for such samples exhibit feature values over a full range of feature values present in the mass spectra generated from samples drawn from the population of patients on which the test is to be used or was initially defined for use, including feature values which are close to the decision boundary of the classification algorithm. In another aspect, methods are disclosed for selection of a new machine qualification sample set, for example when the machine qualification sample set is depleted or cannot be further used for other reasons. In particular, the (new) machine qualification sample set is selected to be a set of samples such that, for each of the features used in the classification algorithm independently, a Kolmogorov- Smirnov test shows no significant difference between the feature value distribution of the (new) machine qualification sample set and a previously identified machine qualification sample set and the set of samples is of the same size as the original, previously identified machine qualification sample set.

The methods of this disclosure are typically performed after a change to the operating characteristics of the mass spectrometer occurs, for example due to service, maintenance, or replacement of a component in the mass spectrometer. Alternatively, the method can be performed periodically (say, every three months) to ensure that machine performance drift does not reach unacceptable levels.

In still another aspect, a system is described for machine performance validation of a mass spectrometer. The system includes a set of N machine qualification samples and a programmed computer comprising a central processing unit and a memory. The memory stores the following data and code for execution by the central processing unit:

a) data representing a classification reference set of mass spectra;

b) data representing a set of performance evaluation mass spectra from the machine qualification set of samples, the performance evaluation mass spectra obtained from the mass spectrometer (e.g., after some maintenance or service on the machine has occurred, i.e., the "test machine run" herein);

c) data representing a set of mass spectra from a standard machine run of the machine qualification set of samples (standard run mass spectra), the standard run mass spectra obtained from the mass spectrometer when the machine was in a qualified state;

d) code representing a classification algorithm operable on feature values of mass spectra with respect to the classification reference set; and e) code for executing the classification algorithm on the data b) representing the performance evaluation spectra with respect to a classification reference set of spectra (test machine run), and for executing the classification algorithm on the data c) representing the standard run mass spectra with respect to the classification reference set; and f) code for comparing the results from the execution of the code of e) with respect to predetermined criteria (e.g., class label concordance, counts of nearest neighbors and associated statistics) to thereby determine whether the performance of the mass spectrometer meets a machine performance validation standard.

BRIEF DESCRIPTION OF DRAWINGS

Presently preferred embodiments are discussed below in conjunction with the appended drawings which are intended to illustrate presently preferred embodiments of the invention, and in which:

FIGS. 4 and 5 are performed. However, variation from the specifics of FIGS. 4 and 5, and selection of different or additional performance criteria, are possible without departure from the scope of the invention.

DETAILED DESCRIPTION

Methodology and Overview

The methodology for validating machine performance of a mass spectrometer will be described in conjunction with the conceptual flow chart of FIGS. 1A and 1B. The mass spectrometer is shown at 110, and may take the form of a MALDI-ToF mass spectrometer, e.g., from Bruker Corporation or other manufacturer. The need for conducting a machine performance validation will normally occur after some event, such as service to the machine 110, repair or replacement of machine parts, adjustment, or some other reason such as the passage of time. To perform the machine validation, a "test machine run" 100 is conducted on a set of samples which are supplied to the mass spectrometer and subject to mass spectrometry. This set of samples is described herein as a "machine qualification sample set" 102, and typically includes N samples where N could be some number between 25 and 100 or possibly larger. The samples making up the set are selected such that spectra from the samples embrace the full range of mass spectral feature values which are used in classification of test samples by a classification algorithm and reference set of spectra, as described in further detail below.

Ordinarily, the machine qualification sample set 102 will be of the same type of material (e.g., blood-based samples) as those of test samples which are subject to mass spectroscopy during normal routine use of the mass spectrometer in classification of test samples.

Figure 1A:
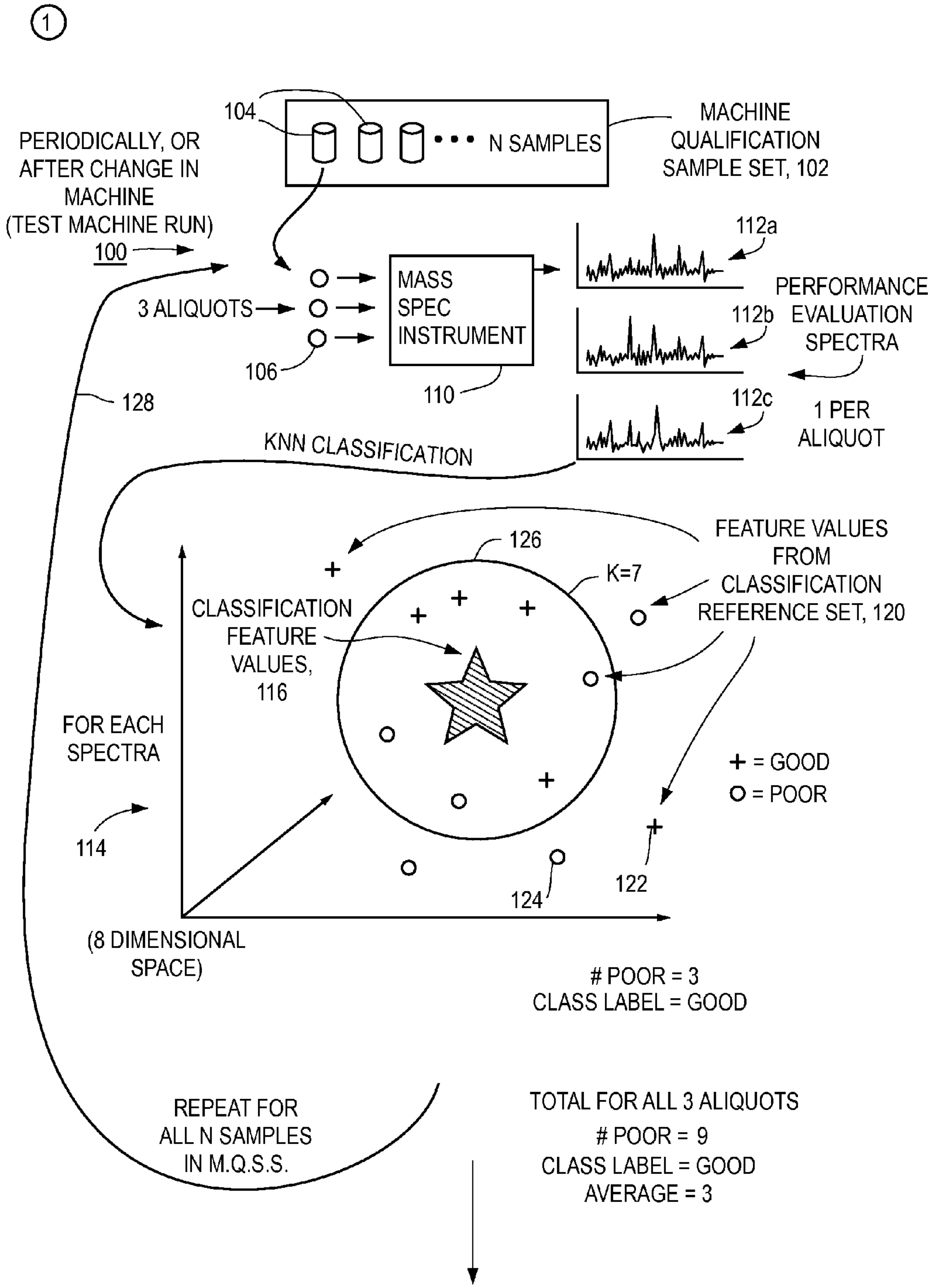
FIGS. 1A and 1B are a conceptual flow diagram showing a methodology for validation of performance of a mass spectrometer with the aid of a programmed computer configured as a classifier and a machine qualification set of samples in accordance with this disclosure.

The test machine run 100 involves processing each of the N samples 104 in the set 102 as shown in FIG. 1A. In particular, each of the N samples is aliquoted into 3 aliquots 106, which are placed on sample spots of a MALDI-ToF plate (not shown) and the aliquots are subjected to mass spectroscopy in the machine 110. Three spectra 112*a*, 112*b* and 112*c* are obtained, one for each of the three aliquots. These spectra for each of the samples 104 are referred to as the "performance evaluation spectra" herein.

The performance evaluation spectra 112 for the sample are then subject to classification using a classification algorithm (e.g., K-NN) with respect to a classification reference set of spectra. This process is done with the aid of a programmed computer shown in FIG. 2. The classification is shown at 114 in FIG. 1A. The classification feature values (integrated intensities at predetermined m/z positions) for one of the performance evaluation spectra are shown by the star 116 in FIG. 1A. Typically, many of such feature values in a spectrum are used for classification, such as for example 8 or 12 of such values, and the Cartesian feature space shown in FIG. 1A at 114 may, in practice, exist in many dimensions such as in 8 or 12 dimensions. Additionally, pre-processing steps, such as background subtraction, alignment and normalization, may be performed on the performance evaluation spectra as disclosed in U.S. Pat. No. 7,736,905; these details are not germane to the present discussion and therefore are omitted for the sake of brevity.

The classification algorithm selects K nearest neighbors in the set 120 of classification reference spectra, the value of K being 7 in this example. The classification reference spectra consist of class-labeled spectra. For each classification reference spectrum, its feature values define a point in the multi-dimensional feature space, with the "o" sign indicating one member of the classification reference set that has one class label (e.g., "Poor") and the "+" sign indicating one member of the classification reference set having a different class label (e.g., "Good"). In the example of FIG. 1A, the value of K is 7 and so the seven nearest neighbors to the feature values of the performance evaluation spectrum (shown as star 116) are selected, e.g., by a Euclidian distance metric. This set is shown at 126. In this example 4 of the 7 nearest neighbors have the "good" class label and 3 of the 7 nearest neighbors have the "Poor" class label. By majority vote algorithm, the spectrum 116 is classified as "Good". This class label for the aliquot is saved, as is the number of "Poor" nearest neighbors from the classification reference set, and the label and counts are associated with the given sample 104 in the set 102.

The classification process shown at 114 in FIG. 1A is repeated for each of the three aliquots. The process stores both the class label for the three aliquots (if they produce the same class label) or otherwise the sample 104 under test is deemed to have the "indeterminate" class label. The counts of number of "Poor" nearest neighbors for each of the aliquots is also saved, as is the total (e.g., 9 Poor neighbors for three aliquots of the sample 104), or average between the three aliquots, as the statistics on the counts of "Poor" neighbors are used in the criteria for evaluation machine performance, as will be explained below.

The processing of the test machine run 100 shown in FIG. 1 for a single sample 104 is performed on each of the N samples in the machine qualification sample set 102, this being shown by the loop indicated at 128. Each of the samples is subject to aliquoting, mass spectrometry, and classification, and saving of classification results (class label, number of Poor neighbors).

A second step in the process is shown at step 130. Basically, at this step, mass spectra previously obtained from each of the same samples 104 in the machine qualification sample set 102 in the course of a "standard" run of the mass spectrometer (i.e., when the machine was in a previously known qualified state) are loaded into the memory of the computer of FIG. 2 and the classification algorithm shown at 114 in FIG. 1A is performed on such spectra. This step can be performed only once and the results saved for future machine validation exercises, and could be performed earlier in time from the test machine run 100. The computer generates for each sample 104 the results of the classification—the class labels for each aliquot and for the set of three, and the counts of the number of "Poor" neighbors, for each aliquot and for the set of three aliquots. The classification performed at step 130 is also done with reference to the same classification feature values and classification reference set of spectra (120) as was used in the test machine run 100.

Figure 1B:
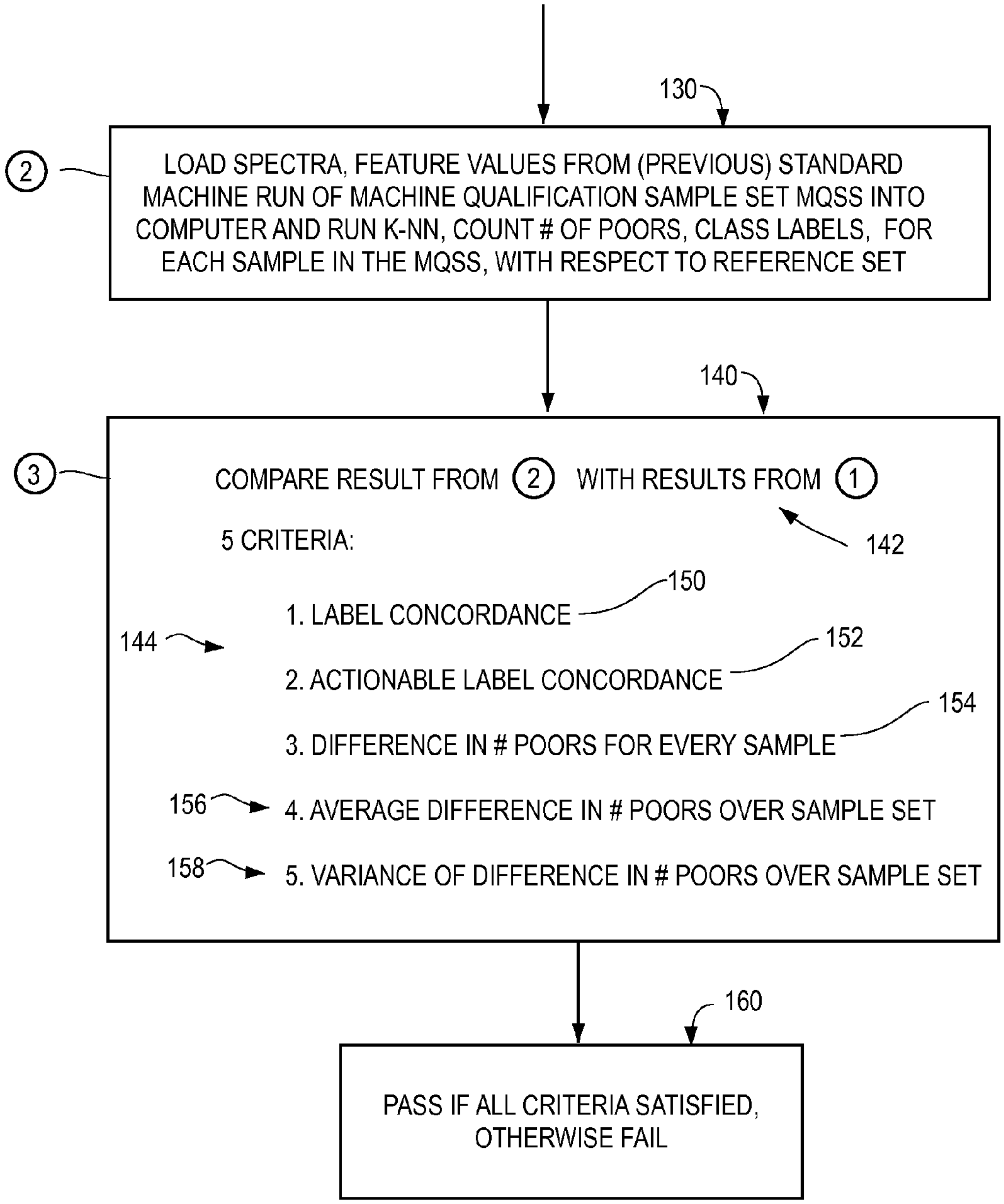

Referring to FIG. 1B, the machine performance is now able to be evaluated by comparing the results of the classification of the same samples in the machine qualification sample set from the test machine run (100) and the standard machine run (130). This evaluation or comparison is shown at step 140. Note that the machine performance evaluation is conducted on the basis of the results of a classifier that operates on the mass spectra, and not merely on concordance of feature values (e.g., comparison of individual peaks in two spectra from the same sample).

Still referring to FIG. 1B, while there are a number of criteria that can be used in step 140, in the preferred embodiment there are five different objective criteria 144 based on the results of the two classifications of the machine qualification sample set. They are:

1) (criteria 150) determining the overall concordance between classification labels for all of the samples in the machine qualification sample set in the two classifications (test machine run 100 and standard machine run 130) and comparison of the concordance with a threshold, such as for example whether the concordance is at least 92.5 percent;

2) (criteria 152) determining the "actionable" concordance between classification labels in the two classifications (test machine run 100 and standard machine run 130), that is, after exclusion of the samples/spectra that produced an indeterminate class label in either run, and comparison of the actionable classification label concordance with a second threshold, such as for example whether the actionable label concordance is at least 97 percent;

3) (criteria 154) determining whether the maximum difference between the counts of the number of "Poor" neighbors summed over all 3 aliquots for every sample in the two runs 100 and 130 is less than a threshold, such as 5.

4) (criteria 156) determining whether the average difference in the counts of the number of "Poor" neighbors over the entire machine qualification sample set is less than a threshold, such as 0.75; and 5) (criteria 158) determining whether the variance in the difference in the counts of the number of "poor" neighbors over the entire machine qualification sample set is less than a threshold, such as 1.84.

Note that the numerical value of the thresholds described above, while useful in the present example, may vary depending on the circumstances—e.g., value of K, number of spectra in the classification reference set, the distribution of spectra in the classification reference set between the two class labels, the nature of the samples used in the machine qualification sample set, the number of samples in the machine qualification sample set, and so on. In practice, the values of the thresholds that are used can be derived by many means, including trial and error, comparison between classification results and feature concordance plots or other methods. In particular, if previously an alternative machine qualification procedure has been carried out by qualified persons, skilled in the art of operating a mass spectrometer for such tests, it is possible to choose the thresholds for criteria such as those in (1)-(5) by examination of archived spectra taken to verify machine performance at earlier times. These spectra can be used as test machine runs and compared with a baseline standard machine run using the methods outlined above and the thresholds for criteria (1)-(5) determined. This process should also be repeated for test machine runs obtained when machine performance was deemed unacceptable by a person qualified in the art of mass spectrometry. Thresholds for criteria (1)-(5), or similar criteria can then be determined by choosing values such that machines previously deemed qualified by other methods satisfy criteria (1)-(5), while machines previously known to have inadequate performance do not satisfy at least one of criteria (1)-(5). A similar use of previous data would be to determine how many and which precise criteria are needed to ensure verification of machine performance.

Figure 3:
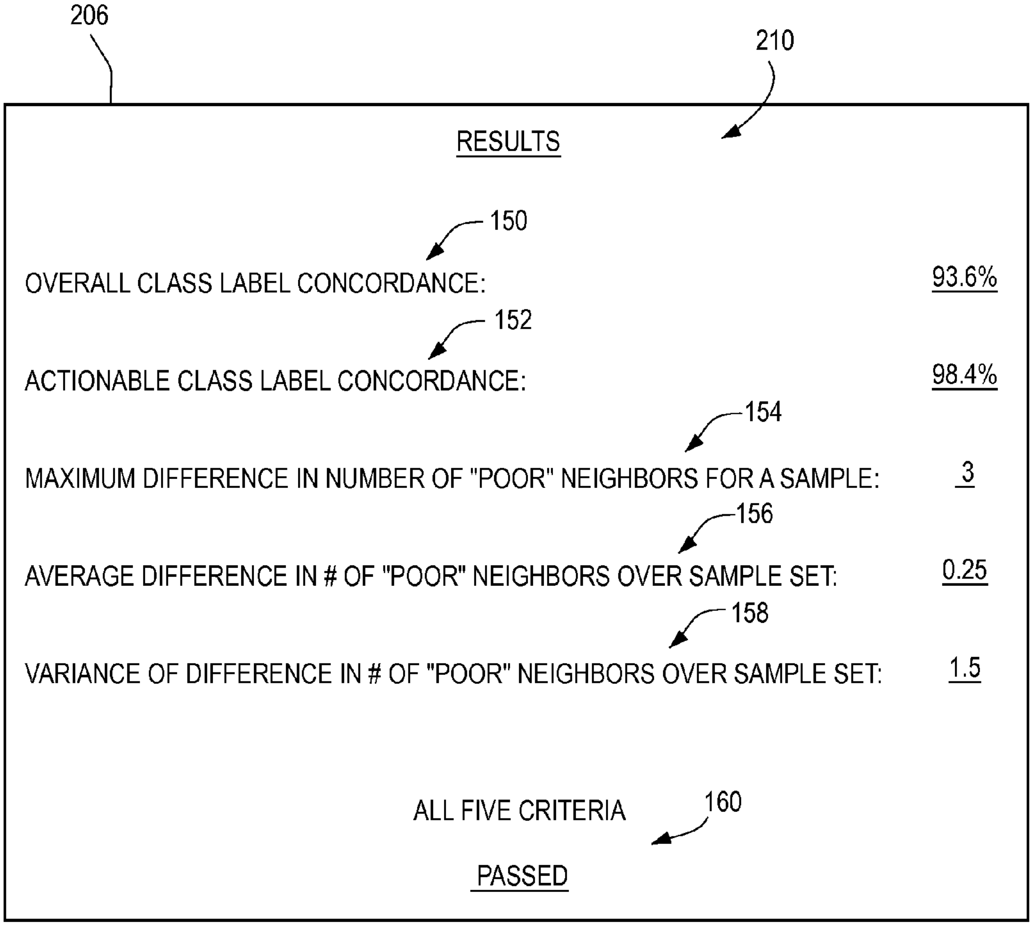
FIG. 3 is an example of a display showing the results of the validation methodology, including results of objective, predetermined machine performance criteria.

Referring again to FIG. 1B, after the criteria are evaluated a result of the validation methodology is generated and then reported as indicated at 160, e.g., by displaying a result on a display of the workstation or by any other suitable means. In this example, if all criteria used at step 140 are met the machine is deemed "validated", otherwise the machine is deemed to have failed the validation. An example of the report is shown in FIG. 3, in which the results 210 of the comparison are displayed on a display 206, including the results of each criteria or comparison 150, 152, 154, 156 and 158, along with the overall result, PASSED, shown at 160.

As noted above, the classification algorithm used in the process of FIG. 1A is a K-nearest neighbor classification algorithm. However, other algorithms could be used, e.g., probabilistic K-nearest neighbor, support vector machine, etc.

In the example of the process of FIGS. 1A and 1B, the machine qualification sample set 102 comprises a set of N samples comprising blood-based samples from human patients. The classification reference set (120) used in the K-NN algorithm takes the form of a set of mass spectra used for classification of other blood-based samples (e.g., test samples in the normal course) with a class label in accordance with the classification algorithm. The reason for using this classification reference set is that what matters for machine validation is performance of the classifier during the normal course of classification of test samples during normal use of the machine, hence it is desirable to use the same reference set used for classification in the normal course in the process of validation of the mass spectrometer.

As noted, the samples making up the machine qualification sample set 102 are selected so as to form a set of samples such that the mass spectra for such samples exhibit feature values over a full range of feature values present in the samples to be routinely tested, including in particular feature values that are near decision boundaries (positions in the multidimensional feature space where the K-NN algorithm operates, where small variations in feature values of a test point can generate different classification labels for the test sample).

It is expected that the methodology of FIGS. 1A and 1B may be performed many times using the machine qualification set of samples 102 over the life of a given machine, for example during a periodic revalidation of the machine or after every significant maintenance, service or parts replacement event. Therefore, the situation may occur where a machine qualification sample set 102 may become depleted or otherwise not usable in which case a new machine qualification set of samples must be identified from some universe of available samples. Such a set should have the characteristics recited in the previous paragraph. Additionally, it is often desirable to select a new set of samples that are in some sense "similar" to the previous set. One way of achieving this similarity is to select samples such that, for each of the features used in the classification algorithm independently, a Kolmogorov-Smirnov test shows no statistically significant difference between the feature distribution of the (new) machine qualification sample set and a previously identified machine qualification sample set. The number of samples in the new set should be the same as, or approximately the same as, the number of samples in the previous machine qualification sample set. Briefly, in statistics, the Kolmogorov-Smirnov test (K-S test) is a nonparametric test for the equality of continuous, one-dimensional probability distributions that can be used to compare a sample with a reference probability distribution (one-sample K-S test), or to compare two samples (two-sample K-S test). The Kolmogorov-Smirnov statistic quantifies a distance between the empirical cumulative distribution function of the sample and the cumulative distribution function of the reference distribution, or between the empirical cumulative distribution functions of two samples. The null distribution of this statistic is calculated under the null hypothesis that the samples are drawn from the same distribution (in the two-sample case) or that the sample is drawn from the reference distribution (in the one-sample case). In each case, the distributions considered under the null hypothesis are continuous distributions but are otherwise unrestricted. The two-sample KS test is one of the most useful and general nonparametric methods for comparing two samples, as it is sensitive to differences in both location and shape of the empirical cumulative distribution functions of the two samples.

System

Figure 2:
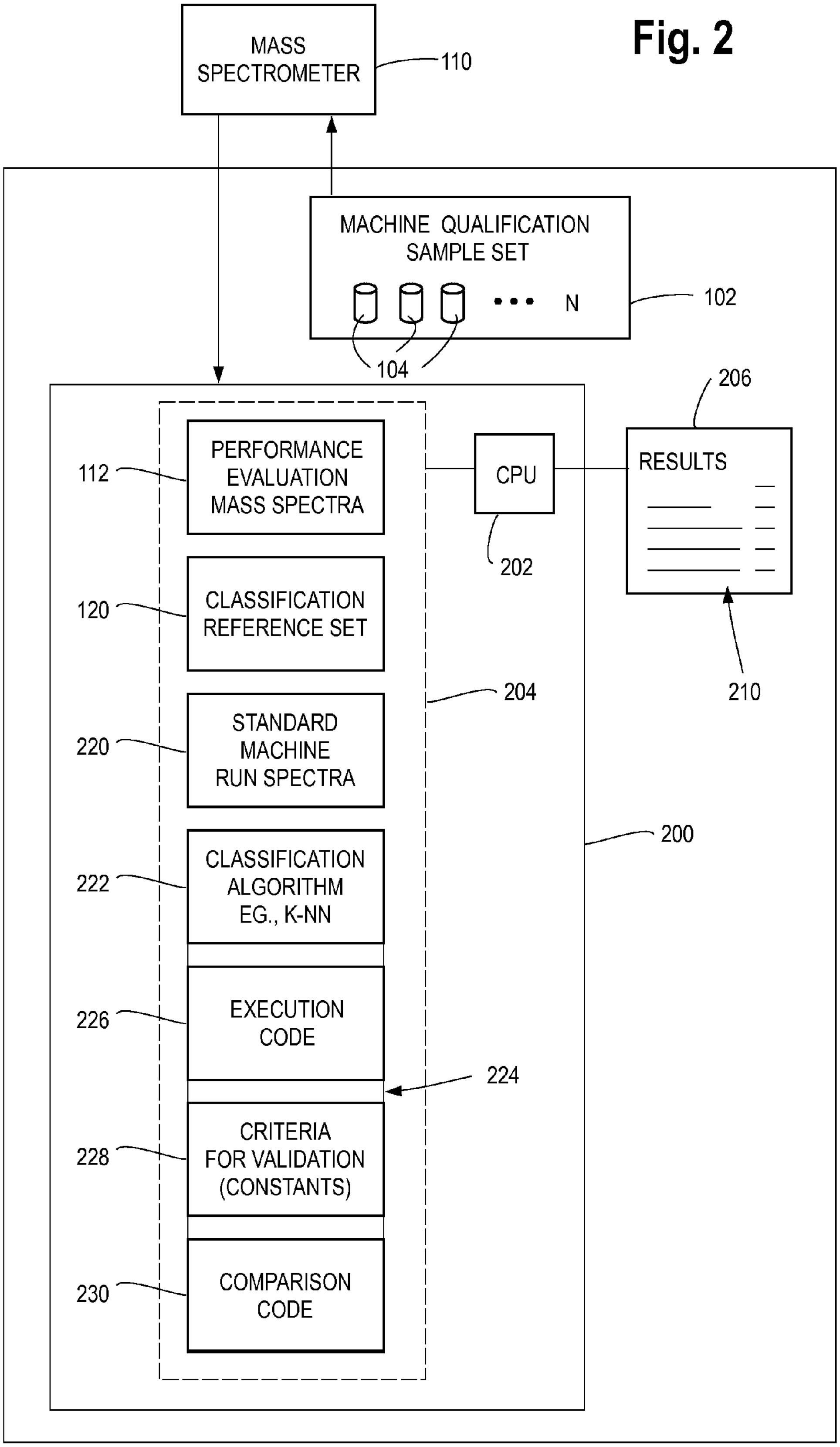
FIG. 2 is block diagram of a system for validation of performance of a mass spectrometer, showing the mass spectrometer, programmed computer, data and program code stored in the computer memory and a display showing the results of the validation methodology.

A system for performing the validation of a mass spectrometer 110 is shown in FIG. 2. The system includes the machine qualification sample set 102 of samples 1 . . . N (104), a programmed general purpose computer 200 having a central processing unit 202 and an associated computer memory 204, e.g., hard disk. The memory 204 of the computer 200 includes the following data and program code:

a) data representing a classification reference set 120 of mass spectra used in the classification described in FIGS. 1A and 1B;

b) data representing a set of performance evaluation mass spectra 112 from the machine qualification sample set, the performance evaluation mass spectra obtained from the mass spectrometer 110;

c) data 220 representing a set of mass spectra from a standard machine run of the machine qualification sample set 102 (standard run mass spectra), the standard run mass spectra previously obtained from the mass spectrometer 110 when the machine 110 was deemed to be in a qualified state;

and a validation code set shown at 224, which consists of:

d) code 222 representing a classification algorithm (e.g., K-NN) operable on feature values of mass spectra with respect to the classification reference set 120. Essentially, this code calculates distance in a multidimensional feature space using Euclidean or other distance metric, determines the class label of nearest neighbors from the classification reference set, and produces a classification for a test mass spectrum using a majority vote algorithm. K-NN and similar classification algorithms are known in the art and code is available from textbooks and other sources.

e) code 226 for executing the classification algorithm code 222 on performance evaluation spectra data with respect to the classification reference set of spectra, and for executing the classification algorithm on the standard run mass spectra data with respect to the classification reference set. This code can be as simple as a main run routine which calls the classification algorithm and includes pointers to spectra to use in the algorithm.

f) code 230 for comparing the results from classification (essentially code implementing step 140 of FIG. 1B) with respect to predetermined criteria to thereby determine whether the performance of the mass spectrometer meets a machine performance validation standard. This code could take the form of counting and comparing class labels, counting numbers of neighbors with a specific class label, generating statistics of such counts (maximum difference, average difference, variance, etc.), calculating concordance between the two classification results on a sample by sample and sample set by sample set basis, and comparison with thresholds. The development of such code would be considered a routine exercise for persons skilled in the art; one example is shown in FIGS. 4 and 5 and discussed below.

The memory 204 further stores constants 228, which can be for example the threshold values used by the comparison code to determine whether the criteria for machine validation are met.

Figure 4:
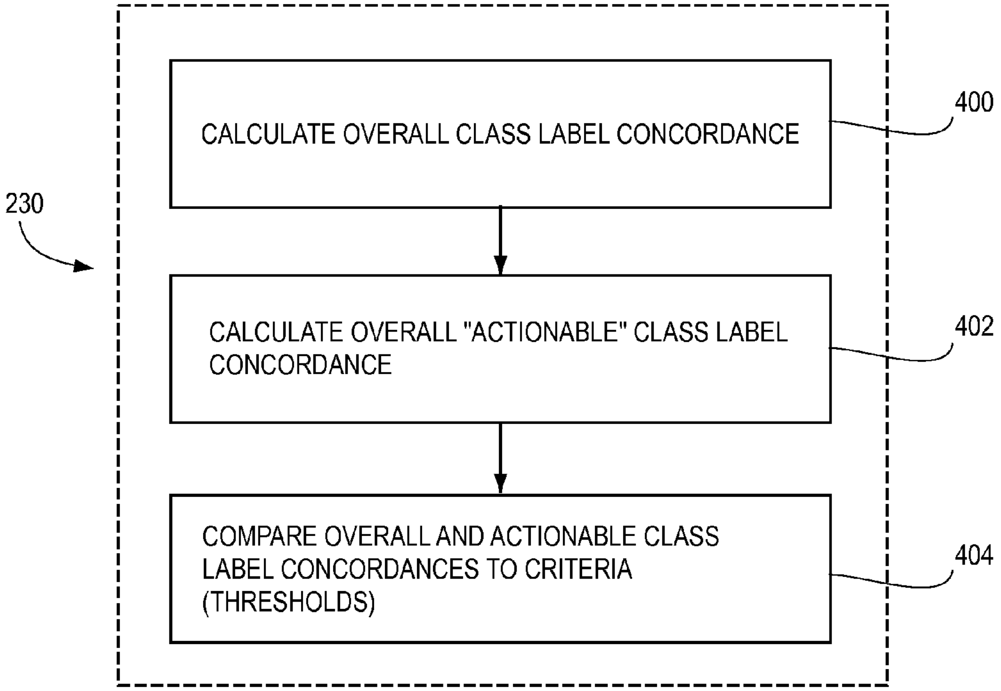
FIGS. 4 and 5 are flow charts showing examples of the comparisons of FIGS. 1 and 2 that are performed in accordance with the method. In preferred embodiments the comparisons of both
Figure 5:
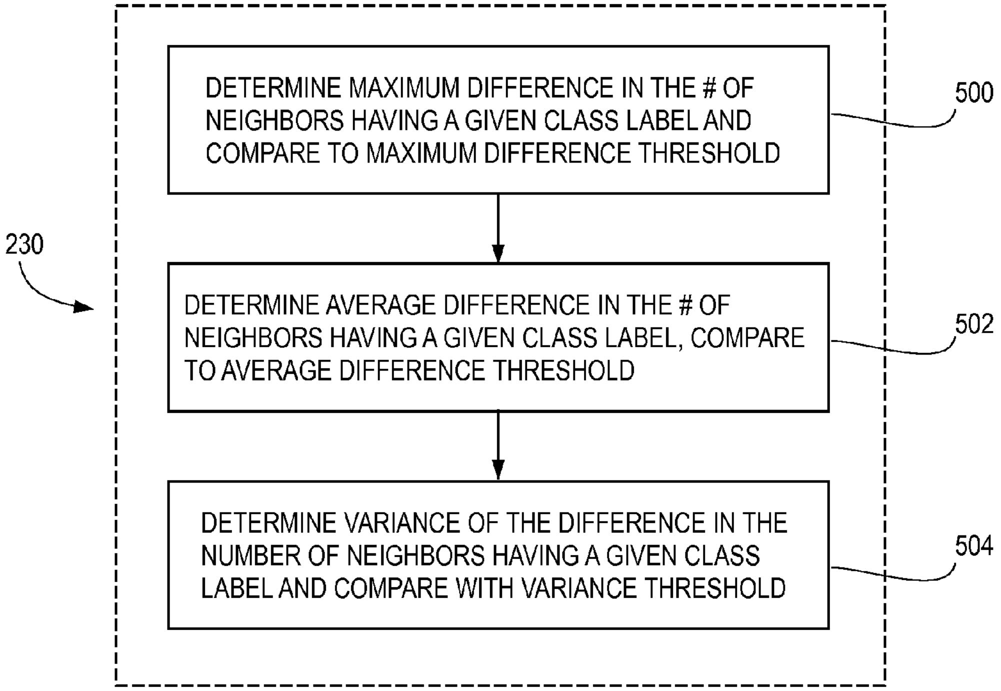

An example of the comparison code 230 is shown in FIGS. 4 and 5. In FIG. 4, the code includes a module 400 that calculates overall class label concordance (that is, degree to which the class labels for the same sample in the test machine run and the standard machine run match, expressed as a percentage). A module 402 calculates the actionable class label concordance (same as above but with removal of indeterminate spectra/samples from the concordance calculation.) A module 404 then compares the overall and actionable class label concordance with the applicable constants (thresholds) and sets a flag (FAIL) if the concordance in either comparison is less than the associated threshold.

In the example of FIG. 5, the code 230 includes a module 500 that determines the maximum difference in the number of nearest neighbors having a given class label (e.g., "Poor") after classification of the two runs (in a pair-wise comparison of classification results for the sample) and compares the result to a maximum difference threshold, e.g., 5 or some other value. If the comparison indicates that the maximum difference is exceeded, the FAIL flag is set.

Module 502 determines the average difference in the number of nearest neighbors having a given class label (e.g., "Poor") over the entire machine qualification sample set in the test and standard machine runs, and compares the result to an average difference threshold. If the result exceeds the threshold the FAIL flag is set.

Module 504 determines the variance of the difference in the number of nearest neighbors having the given class label (e.g., "Poor") and compares the result with a variance threshold. If the result exceeds the threshold the FAIL flag is set.

In a preferred embodiment, the modules of both FIGS. 4 and 5 are in the computer memory to make up the set of validation criteria. However, variation from this example is of course possible within the scope of this disclosure.

Example 1

An example of a machine validation for mass spectrometers used in the VERISTRAT test of the applicant's assignee will now be described.

The machine qualification sample set 102 consisted of a set of 67 blood-based samples referred to as "Italian B" samples in the paper of Taguchi et al., JNCI (2007) v. 99 (11), 838-846, or a set of 60 blood-based samples from advanced cancer patients selected to be similar to the Italian B sample set.

The classification reference set of spectra were the set of spectra used in a K-NN classifier to classify test samples in Taguchi et al.

A standard machine run (generation of mass spectra) was performed on the machine qualification sample set while the machine was in a state of qualification/validation and the spectra were saved in computer memory. At the time of validation, the same set of samples were then run through the machine using the process of FIG. 1A (i.e., a test machine run 100 was performed). Classification of the spectra in both machine runs was conducted with a K-NN algorithm, with K=7, using the features and the classification reference set described in Taguchi et al.

The following five machine performance validation criteria (144) and thresholds were used in this example:

1. Difference in the number of poor neighbors for every sample ≦5
2. Average difference in number of poor neighbors over sample set ≦0.75
3. Variance of difference in number of poor neighbors over sample set ≦1.84.
4. Overall class label concordance of at least 92.5%
5. "Actionable" class label (class labels in which indeterminate samples are removed from the comparison analysis) concordance of at least 97%

If all 5 criteria are satisfied: result='pass'
If at least 1 criterion not satisfied: result='fail'

The process was done for four different previously qualified machines (identified in Table 1 as Voyager, Gamma, Delta, Flextreme) at different times and after different events indicating the need for validation, in which the machine qualification methodology resulted in PASS on three occasions and a FAIL on two occasions. The results are shown in Table 1:

TABLE 1

| Criteria | Gamma 2010 vs Voyager | Delta 2009 vs Voyager | Delta 2010 vs Voyager | Flextreme vs Gamma: Successful February 2012* | Flextreme vs Gamma: Unsuccessful 28 Jul. 2012* | Flextreme vs Gamma: Unsuccessful 31 Jul. 2012* |
|---|---|---|---|---|---|---|
| Maximum difference in # Poor neighbors for a sample | 3 | 3 | 5 | 2 | 5 | 6 |
| Average difference in # Poor neighbors over sample set | 0.43 | 0.63 | 0.64 | 0.13 | 0.35 | 0.80 |
| Variance of difference in # Poor neighbors over sample set | 1.05 | 1.82 | 1.16 | 0.65 | 1.86 | 1.83 |
| Overall VeriStrat label concordance | 92.5% | 95.5% | 94.0% | 98.3% | 95.0% | 93.3% |
| Actionable VeriStrat label (i.e. Good or Poor) concordance | 98.4% | 98.5% | 98.4% | 100% | 98.3% | 98.2% |

*The machine qualification sample set in 2012 examples consisted of 60 blood-based samples from advanced cancer patients selected to be similar to the "Italian B" sample set. This set was used in order to preserve the "Italian B" sample set. This sample set does not quite satisfy the K-S non-significance test for all features for comparison with the "Italian B" sample set; however it is suitable for inclusion in Table 1 to illustrate the example of how the machine validation criteria are used and provide an example where the validation methodology resulted in a failure.

Note that in this example, the validation of Jul. 28, 2012 was unsuccessful because the variance of the difference in the number of poor neighbors over the sample set was 1.86, which is greater than the threshold of 1.84. The validation of Jul. 31, 2012 was also unsuccessful due to the average difference in the number of poor neighbors over the sample set of 0.8, which is higher than 0.75, the threshold established for this criterion.

If the validation method of this disclosure results in a failure, then further steps are taken to investigate the cause of the failure and to bring the machine into a state of validation or qualification. Such steps, which may involve various calibrations or adjustments to the instrument, are beyond the scope of this disclosure and will vary depending on such factors as the nature of the event that occurred prior to the performing of the method (such as the maintenance, repair or service done on a particular component).

While the above description has been intended as a full disclosure of the preferred methods and systems for practicing the invention, all questions concerning scope of the invention are to be determined by reference to the appended claims. Note that in claim 1, the order of steps is not critical and could be changed from the order recited, for example step d) could be performed before step b), and steps c) and d) could be performed at the same time, or step d) could be performed prior to step c).

We claim:

1. A method for validating machine performance of a mass spectrometer, comprising the steps of:

a) providing a machine qualification set of samples;

b) operating the mass spectrometer on the machine qualification set of samples to thereby obtain a set of performance evaluation spectra;

c) executing a classification algorithm on the performance evaluation spectra with respect to a classification reference set of spectra with the aid of a programmed computer;

d) executing the classification algorithm on a set of spectra obtained from the machine qualification set of samples in a previous standard machine run of the machine qualification set of samples with respect to the classification reference set with the programmed computer;

e) comparing the results from the execution of the classification algorithm in step c) with the results of the execution of the classification algorithm in step d) and f) generating a machine validation result from the comparison of step e).

2. The method of claim 1, wherein the classification algorithm comprises a K-nearest neighbor classification algorithm.

3. The method of claim 2, wherein the comparing step e) further includes comparing a count of the number of nearest neighbors having a given class label for each sample in the machine qualification set of samples in the execution of the classification algorithm of steps c) and d).

4. The method of claim 2, wherein the comparison of step e) includes the steps of:

1) determining the maximum difference in the number of nearest neighbors having the given class label for a sample over the entire machine qualification set of samples from steps c) and d) and comparing the maximum difference with a maximum difference threshold;

2) determining the average difference in the number of nearest neighbors having the given class label per sample over the entire machine qualification set of samples from steps c) and d), and comparing the average difference with an average difference threshold; and 3) determining the variance of the difference in the number of nearest neighbors having the given class label per sample over the entire machine qualification set of samples from steps c) and d) and comparing the variance with a variance threshold.

5. The method of claim 1, wherein the comparing step e) includes a comparison of classification label concordance between the results of the execution of the classification algorithm in step c) with the results of the execution of the classification algorithm in step d).

6. The method of claim 5, wherein the comparing step e) further includes a comparison of the classification label concordance between the results of the execution of the classification algorithm in step c) with the results of the execution of the classification algorithm in step d) after exclusion of spectra from samples in the machine qualification set of samples which produced an indeterminate class label in either step c) or step d).

7. The method of claim 1, wherein the machine qualification set of samples comprises a set of N samples comprising blood-based samples from human patients and wherein the classification reference set comprises a set of mass spectra used for classification of other blood-based samples with a class label in accordance with the classification algorithm.

8. The method of claim 1, wherein the machine qualification set of samples comprises a set of samples selected such that the mass spectra for such samples exhibit feature values over a full range of feature values present in the expected population to be tested, in the classification reference set and used in the classification algorithm.

9. The method of claim 1, wherein the machine qualification set of samples comprises a set of samples selected such that, for each of the features used in the classification algorithm, a Kolmogorov-Smirnov test shows no statistically significant difference between a feature distribution in the machine qualification set of samples and a previously identified machine qualification set of samples of similar size.

10. The method of claim 1, wherein the steps a) to e) are performed after a change to the operating characteristics of the mass spectrometer occurs, for example due to service, maintenance, or replacement of a component in the mass spectrometer.

11. The method of claim 1, wherein the steps b), c), e) and f) are performed periodically.

12. A system for machine performance validation of a mass spectrometer, comprising:

a set of N machine qualification samples; and a programmed computer comprising a central processing unit and a memory storing:

a) data representing a classification reference set of mass spectra;

b) data representing a set of performance evaluation mass spectra from the set of N machine qualification samples, the performance evaluation mass spectra obtained from the mass spectrometer;

c) data representing a set of mass spectra from a standard machine run of the set of N machine qualification samples (standard run mass spectra), the standard run mass spectra obtained from the mass spectrometer in a qualified state;

d) code representing a classification algorithm operable on feature values of mass spectra with respect to the classification reference set; and e) code for executing the classification algorithm on the data b) representing the performance evaluation spectra with respect to a classification reference set of spectra, and for executing the classification algorithm on the data c) representing the standard run mass spectra with respect to the classification reference set; and f) code for comparing the results from the execution of the code of e) with respect to predetermined criteria to thereby determine whether the performance of the mass spectrometer meets a machine performance validation standard.

13. The system of claim 12, wherein the classification algorithm comprises a K-nearest neighbor classification algorithm.

14. The method of claim 13, wherein the code f) includes code for comparing a count of the number of nearest neighbors having a given class label for each sample in the set of N machine qualification samples in the execution of the classification algorithm of code e) on both the data representing the performance evaluation spectra and the data representing the standard run mass spectra.

15. The system of claim 14, wherein the comparing code f) further includes a code for comparison of the classification label concordance between the results of the execution of the classification algorithm by code e) after exclusion samples in the set of N machine qualification samples which produced an indeterminate class label.

16. The system of claim 14, wherein the comparing code f) includes code for:

1) determining the maximum difference in the number of nearest neighbors having the given class label per sample over the entire set of N machine qualification samples from the code e) and comparing the maximum difference with a maximum difference threshold;

2) determining the average difference in the number of nearest neighbors having the given class label per sample over the entire set of N machine qualification samples from code e), and comparing the average difference with an average difference threshold; and 3) determining the variance of the difference in the number of nearest neighbors having the given class label per sample over the entire set of N machine qualification samples from code e) and comparing the variance with a variance threshold.

17. The system of claim 12, wherein the code f) includes code for comparison of the classification label concordance between the results of the execution of the classification algorithm of code e).

18. The system of claim 12, wherein the set of N machine qualification samples comprises a set of N blood-based samples from human patients and wherein the classification reference set comprises a set of mass spectra used for classification of other blood-based samples with a class label in accordance with the classification algorithm.

19. The system of claim 12, wherein the set of N machine qualification samples comprises a set of samples selected such that the mass spectra for such samples exhibit feature values over a full range of feature values expected in the population for which the mass spectrometer-based test is to be used, are present in the classification reference set and are used in the classification algorithm to classify a mass spectrum.

20. The system of claim 12, wherein the set of N machine qualification samples comprises a set of samples selected such that, for each of the features used in the classification algorithm, a Kolmogorov-Smirnov test shows no statistically significant difference between a feature distribution of the set of N machine qualification samples and a previously identified set of machine qualification samples.

* * * * *